United States Patent
Srinivasaraghavan et al.

(10) Patent No.: US 11,838,597 B1
(45) Date of Patent: Dec. 5, 2023

(54) SYSTEMS AND METHODS FOR CONTENT DISCOVERY BY AUTOMATIC ORGANIZATION OF COLLECTIONS OR RAILS

(71) Applicant: Verizon Patent and Licensing Inc., Basking Ridge, NJ (US)

(72) Inventors: Haripriya Srinivasaraghavan, Plano, TX (US); Vamshi Gillipalli, Irving, TX (US); Yogalakshmi Narayanasamy, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/651,519

(22) Filed: Feb. 17, 2022

(51) Int. Cl.
H04N 21/482 (2011.01)
H04N 21/466 (2011.01)

(52) U.S. Cl.
CPC ..... H04N 21/4826 (2013.01); H04N 21/4668 (2013.01)

(58) Field of Classification Search
CPC ........... H04N 21/4826; H04N 21/4668; H04N 21/431; H04N 21/4438; H04N 21/23418; H04N 21/44008; H04N 21/4332; H04N 19/117
USPC ......................................................... 725/38
See application file for complete search history.

(56) References Cited

U.S. PATENT DOCUMENTS

| | | | | |
|---|---|---|---|---|
| 5,371,553 A * | 12/1994 | Kawamura | ...... | H04N 21/42204 348/E5.103 |
| 10,631,029 B1 * | 4/2020 | Nijim | ................... | H04N 21/251 |
| 2006/0026636 A1 * | 2/2006 | Stark | ...................... | H04N 7/173 725/38 |
| 2006/0026647 A1 * | 2/2006 | Potrebic | ............. | H04N 21/4828 348/E5.103 |
| 2008/0066012 A1 * | 3/2008 | Goodwin | ........... | H04N 21/4828 715/825 |
| 2009/0307726 A1 * | 12/2009 | Levin | ................... | H04N 21/435 725/46 |
| 2010/0031162 A1 * | 2/2010 | Wiser | ................... | H04N 21/431 715/747 |
| 2011/0126236 A1 * | 5/2011 | Arrasvuori | ......... | H04N 21/4755 725/46 |
| 2014/0344861 A1 * | 11/2014 | Berner | ............... | H04N 21/4826 725/46 |
| 2016/0259861 A1 * | 9/2016 | Kocks | ................... | G06F 16/248 |
| 2016/0360266 A1 * | 12/2016 | Wilms | ............... | H04N 21/4756 |
| 2017/0214954 A1 * | 7/2017 | Trollope | .............. | H04N 21/251 |

OTHER PUBLICATIONS

Jeff Newman, Netflix's new "Categories" menu could make browsing by genre easier, Jan. 27, 2022, Tech Hive, https://www.techhive.com/article/608866/netflix-new-categories-menu-could-make-browsing-by-genre-easier.html (Year: 2022).*

* cited by examiner

*Primary Examiner* — Cynthia M Fogg

(57) ABSTRACT

In some implementations, a device may receive historical content data indicating historical characteristics associated with one or more groups of content. The device may determine, based on the historical content data, one or more characteristics associated with a time period. The device may determine, based on the one or more characteristics, a new group of content associated with the time period. The device may generate a display element for accessing content included in the new group of content during the time period.

20 Claims, 11 Drawing Sheets

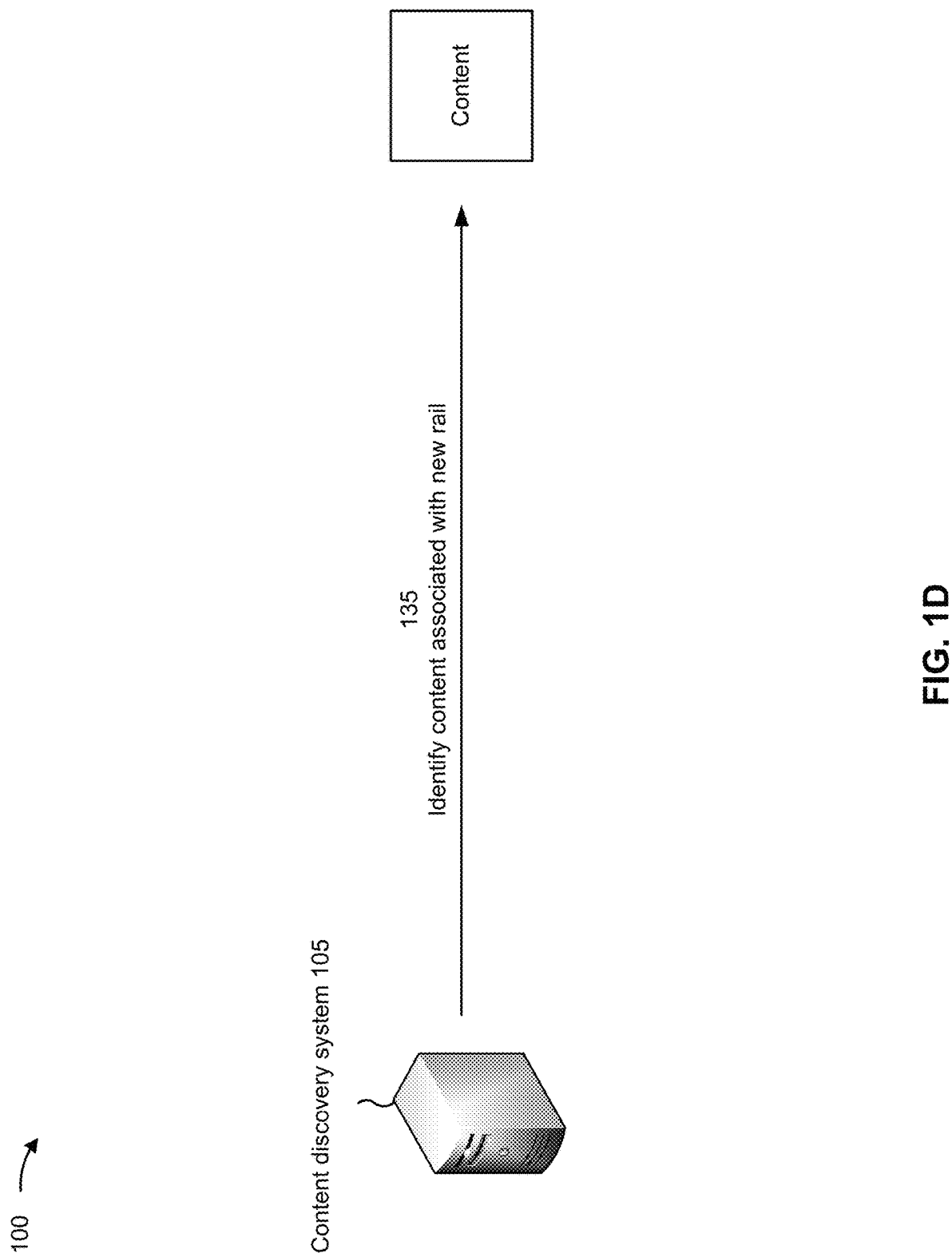

SYSTEMS AND METHODS FOR CONTENT DISCOVERY BY AUTOMATIC ORGANIZATION OF COLLECTIONS OR RAILS

BACKGROUND

A rail is a display element that can be selected by a user to view items or content associated with a particular category. Commonly, a rail contains a rail naming and the rail contents. The rail naming may include an icon, a string of text, and/or another type of information that is descriptive of a type of the items or content associated with the rail. The contents of the rail are a set of titles which the users will be able to discover as part of the rail. For example, a rail associated with a group of dramatic movies may include a selectable display element that includes the text "Dramas" or "Dramatic Movies" to indicate that a user can select the display element to view the group of dramatic movies.

BRIEF DESCRIPTION OF THE DRAWINGS

FIGS. 1A-1G are diagrams of an example associated with content discovery by the automatic organization of collections or rails.

DETAILED DESCRIPTION OF EXAMPLE EMBODIMENTS

Figure 1A:
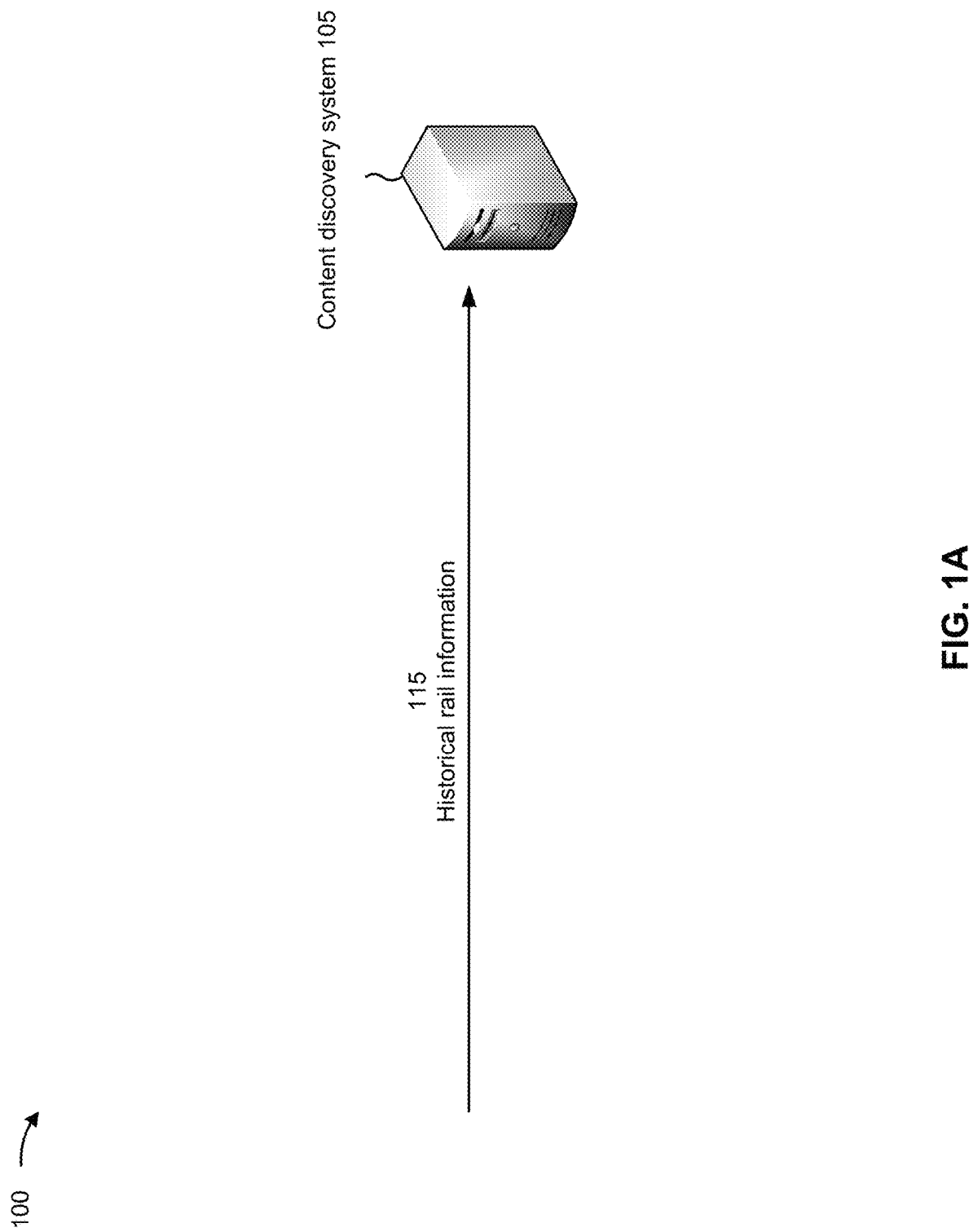

The following detailed description of example implementations refers to the accompanying drawings. The same reference numbers in different drawings may identify the same or similar elements.

Commonly, rails may be utilized to assist a user with content discovery. For example, instead of requiring a user to determine a set of keywords to be included in a search query for discovery content, a set of rails may be displayed to the user. Each rail may include information descriptive of a group of content. The user may view the set of rails to see the various groups of content available to be accessed by the user.

As an example, a web page of a streaming service provider may include a list of rails indicating different genres of content (e.g., action movies, dramas, reality TV, and horror movies). A user may select a rail to view a group of content associated with the genre indicated by the rail (e.g., a user may select a rail associated with action movies to view a list of action movies available via the streaming service provider).

However, in some cases, the list of rails may be relatively large (e.g., tens, hundreds, or thousands of rails), which may be overwhelming to a user. Further, users may not take the time to view the entire list of rails and may be unaware of content associated with the rails included at the end of the list.

To enable a user to discover relevant content (e.g., content of interest to the user), the rails may be provided in a particular order. For example, the rails may be listed in an order based on a popularity associated with each rail (e.g., a number of times users have selected each rail), or other criteria. However, different users may be interested in different types of content, and determining the order based on popularity may prevent a user from discovering content that is of interest to the user based on the content not being popular with other users. Further, when a new rail is initially created, the quantity of users that have selected the new rail may be relatively low (e.g., zero), and, therefore, the new rail may be ordered last in the list. Because the new rail is ordered last in the list, the quantity of users viewing the new rail may be less than the quantity of users viewing a rail placed at the top of the list. Thus, the new rail may not be viewed by users that stop browsing the list of rails prior to viewing the entire list.

Typically, the rails may be created by a curator (e.g., an employee of a streaming service provider that is part of a content team and/or responsible for creating rails) to enable users to discover content associated with a particular season, a particular event, or a particular region. For example, a rail associated with a group of horror movies may be provided around Halloween, a rail associated with political content may be provided during a period prior to an upcoming election, or a rail associated with live sporting events that include a particular sports team may be provided to users in a geographical area associated with the sports team. However, because the rails may be provided to a large number of diverse users located in various different geographic regions, determining the rails that should be provided to different groups of users located in different geographic regions based on events occurring in the different regions and the interests of the diverse users may be difficult.

Further, once a curator determines the type of rail to be created (e.g., a rail associated with content related to a season, an upcoming event, or a geographic region), the curator must identify the content to be associated with the rail. In some cases, a service provider may provide a large quantity of content associated with the type of rail that is to be created, which may make it difficult for the curator to determine which items of content are to be associated with the rail.

Some implementations described herein enable a content discovery system to determine a type of rail to be created, automatically generate the type of rail, and/or determine an order in which a group of rails (e.g., a group of rails including the generated rail) are to be provided for display to a user. For example, the content discovery system may analyze historical rail information associated with a plurality of previously created rails. The historical rail information may include information indicating a genre associated with a previously created rail, a type of content (e.g., live content, video on demand (VOD) content, and/or pay-per-view content) associated with the previously created rail, search filters associated with the previously created rail, and/or a validity period associated with the previously created rail (e.g., dates on which the previous created rail was provided to users), among other examples. The content discovery system may utilize the historical rail information to determine a type of rail to be created based on a current date, season, and/or upcoming event.

In some implementations, the content discovery system may utilize the historical rail information as training data to train a model to determine a type of rail to be created based on one or more parameters (e.g., a current date, season, and/or geographic region, among other examples). The content discovery system may provide information identifying the one or more parameters to the trained model, and the trained model may generate and output information identifying a type of rail and a confidence score indicating a measure of confidence that the type of rail was accurately determined based on the one or more parameters.

In some implementations, the content discovery system may automatically generate the rail based on determining that the type of rail is to be created. For example, the content discovery system may identify content included in similar previously created rails based on the historical rail information. Alternatively, and/or additionally, the content discovery system may identify a set of search filters associated with the similar previously created rails based on the historical rail information. The content discovery system may utilize the search filters to search a database of content to identify content to be associated with the new rail.

In some implementations, the content discovery system may determine an order in which a group of rails (e.g., a group of rails including the new rail created by the content discovery system) are to be included in a list of rails. For example, the content discovery system may determine the order in which the group of rails are to be included in the list of rails based on preferences associated with a particular user and/or a group of users to which the list of rails is to be displayed.

FIGS. 1A-1G are diagrams of an example 100 associated with content discovery by the automatic organization of collections or rails. As shown in FIGS. 1A-1G, example 100 includes a content discovery system 105 and a user device 110. The content discovery system 105 and the user device 110 are described in greater detail below with respect to FIGS. 3 and 4.

In some implementations, "rail" may refer to a display element that can be selected (e.g., by a user via the user device 110) to view a group of content associated with the a category and/or a set of constraints. In some implementations, the rail may include an indication of a type of the content included in the group of content. For example, the rail may include text indicating the type of the content (e.g., a genre), text indicating a format (e.g., VOD content, live content, and/or pay-per-view content, among other examples) of the content, and/or an icon or a thumbnail indicating the type and/or the format of the content. As described in greater detail herein, the content discovery system 105 may identify a new rail to be generated, generate the new rail, and/or determine a display order in which a group of rails (e.g., a group of rails including the new rail) are to be included in a list of rails provided to a user.

As shown in FIG. 1A, and by reference number 115, the content discovery system 105 may receive historical rail information. The historical rail information may include information associated with a plurality of rails previously generated and/or provided to a user. For example, for each rail, the historical rail information may include information identifying a type of content associated with the rail, a format of the content associated with the rail, a season associated with the rail and/or the content associated with the rail, a validity period (e.g., a season and/or a date range during which the rail is provided to a user) associated with the rail, one or more search filters associated with the rail, and/or one or more keywords associated with the rail, among other examples.

In some implementations, the historical rail information may include information associated with search queries input by one or more users. In some implementations, the search queries may include a natural language search query. For example, a user may speak a search query into a microphone associated with a user device 110. The user device 110 may store the search query as historical rail information and may provide the historical rail information to the content discovery system 105.

The content discovery system 105 may utilize natural language processing to process the search query and to generate a normalized search query. For example, the content discovery system 105 may convert text to lowercase, remove punctuation, remove stop words, strip white space, perform stemming, perform lemmatization, and/or spell out abbreviations and acronyms. In some implementations, the content discovery system 105 may perform named-entity recognition, apply parts of speech, apply context to disambiguate the named entities, and use intent hints in order to recognize the entities. In some implementations, the content discovery system 105 may remove sparse words, such as words that are uncommon (e.g., according to a domain-specific corpus). The number of times users utter a particular natural language search query can also be used to select which of the queries will be converted into subsequent rails and which ones will not—the more common/popular user searches will be more suitable for being converted to automatic rails than queries that are less commonly used.

Figure 1B:
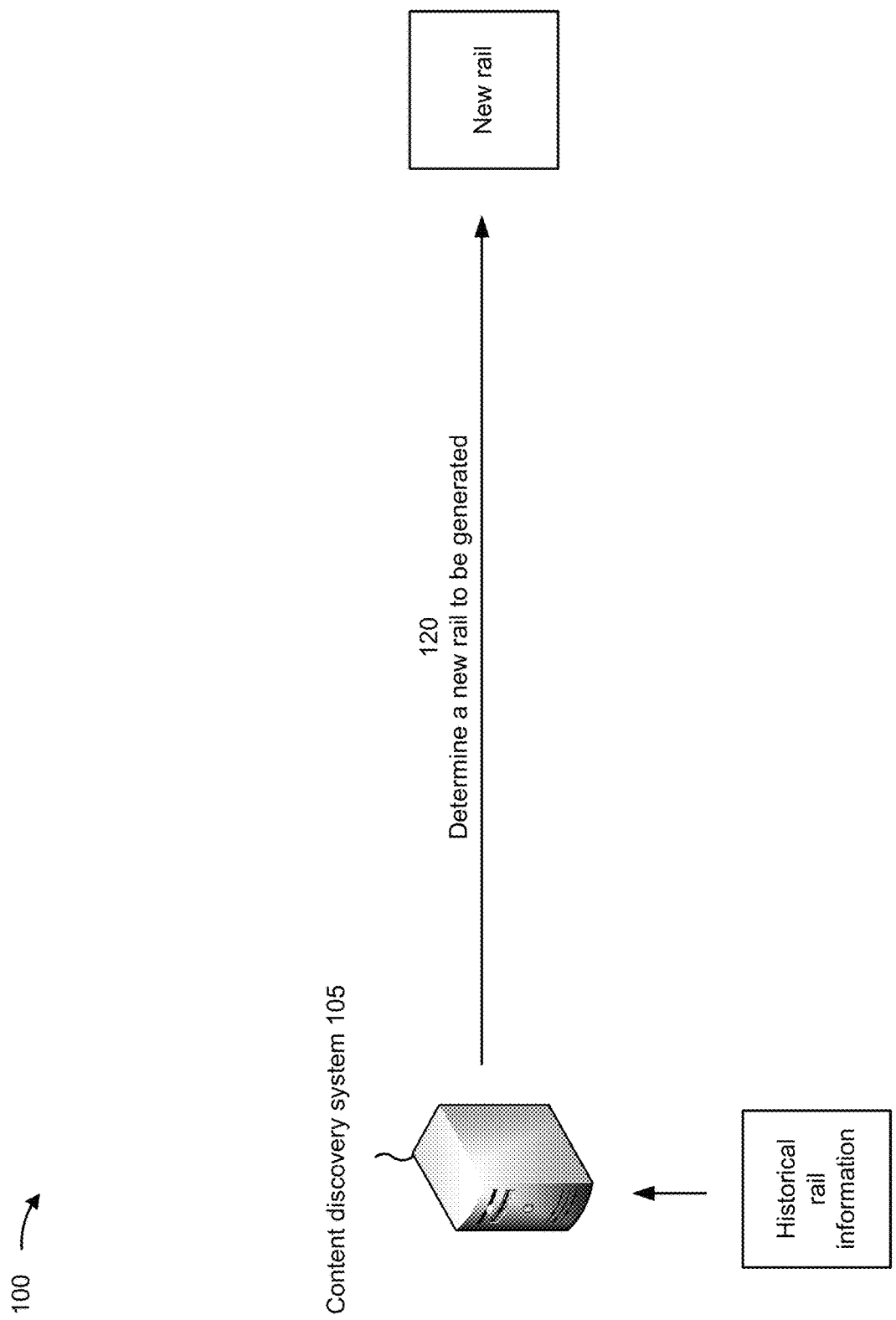

As shown in FIG. 1B, and by reference number 120, the content discovery system 105 may determine a new rail to be generated based on the historical rail information. In some implementations, the content discovery system 105 may utilize the historical rail information to determine the new rail to be generated based on one or more parameters associated with a current and/or upcoming time period. In some implementations, the one or more parameters may include a current date, a future date, a date range (e.g., October, next week, or from a first date through a second date), a current or upcoming event (e.g., a live or upcoming sporting event), a season (e.g., fall, summer, Halloween, football season, or baseball season, among other examples), and/or a geographic region (e.g., a city, a state, and/or a country), among other examples.

In some implementations, the content discovery system 105 may receive information indicating the one or more parameters from another device. In some implementations, the other device may be a device (e.g., the user device 110 or a set top box) via which the new rail is to be displayed. For example, the device via which the new rail is to be displayed may periodically provide a request for an updated list of rails to the content discovery system 105. The request may include information identifying one or more parameters associated with a time period during which the updated list of rails is to be displayed by the device.

Alternatively, and/or additionally, the other device may be a device that is different from the device via which the new rail is to be displayed. For example, the other device may be a user device 110 and/or a server device associated with the content discovery system 105 that periodically provides information indicating the one or more parameters and/or may provide the information indicating the one or more parameters based on receiving information input by a user.

For example, a user may provide an input indicating the one or more parameters and/or indicating that the one or more parameters are to be provided to the content discovery system 105 via the user device 110. The user device 110 may provide (either directly or via one or more other devices) the information identifying the one or more parameters to the content discovery system 105 based on receiving the input.

In some implementations, the content discovery system 105 may analyze the historical rail information to identify one or more rails associated with the one or more parameters. For example, the one or more parameters may indicate a season and the content discovery system 105 may analyze the historical rail information to identify a set of previously generated rails associated with the season indicated by the one or more parameters.

In some implementations, the content discovery system 105 may determine that a new rail is to be generated based on a quantity of rails included in the set of previously generated rails. For example, the content discovery system 105 may determine that a new rail is to be generated based on the quantity of rails satisfying one or more criteria (e.g., the quantity of rails satisfying a quantity threshold).

In some implementations, the content discovery system 105 may determine a type of the new rail to be generated based on the identified set of previously generated rails. For example, the content discovery system 105 may determine a set of parameters that are common to the identified set of previously generated rails and/or a set of parameters that are associated with at least a threshold quantity of rails included in the identified set of previously generated rails.

In some implementations, the content discovery system 105 may determine a name and/or text to be associated with the new rail based on a set of normalized search queries associated with the new rail. For example, the content discovery system 105 may determine a most common normalized search query associated with the rail and may utilize the most common normalized search query as the name and/or the text associated with the new rail.

In some implementations, the content discovery system 105 may train and/or utilize a model to determine that the new rail is to be generated and/or a type of the new rail. The model may be trained based on the historical rail information. The model may be trained to determine, based on information regarding a time period, whether a new rail is to be created and/or a type of the new rail. In some implementations, the model may be trained to determine a confidence score that reflects a measure of confidence that the determination is accurate for the time period. In some implementations, the content discovery system 105 may train the model in a manner similar to that described below with respect to FIG. 2.

Figure 1C:
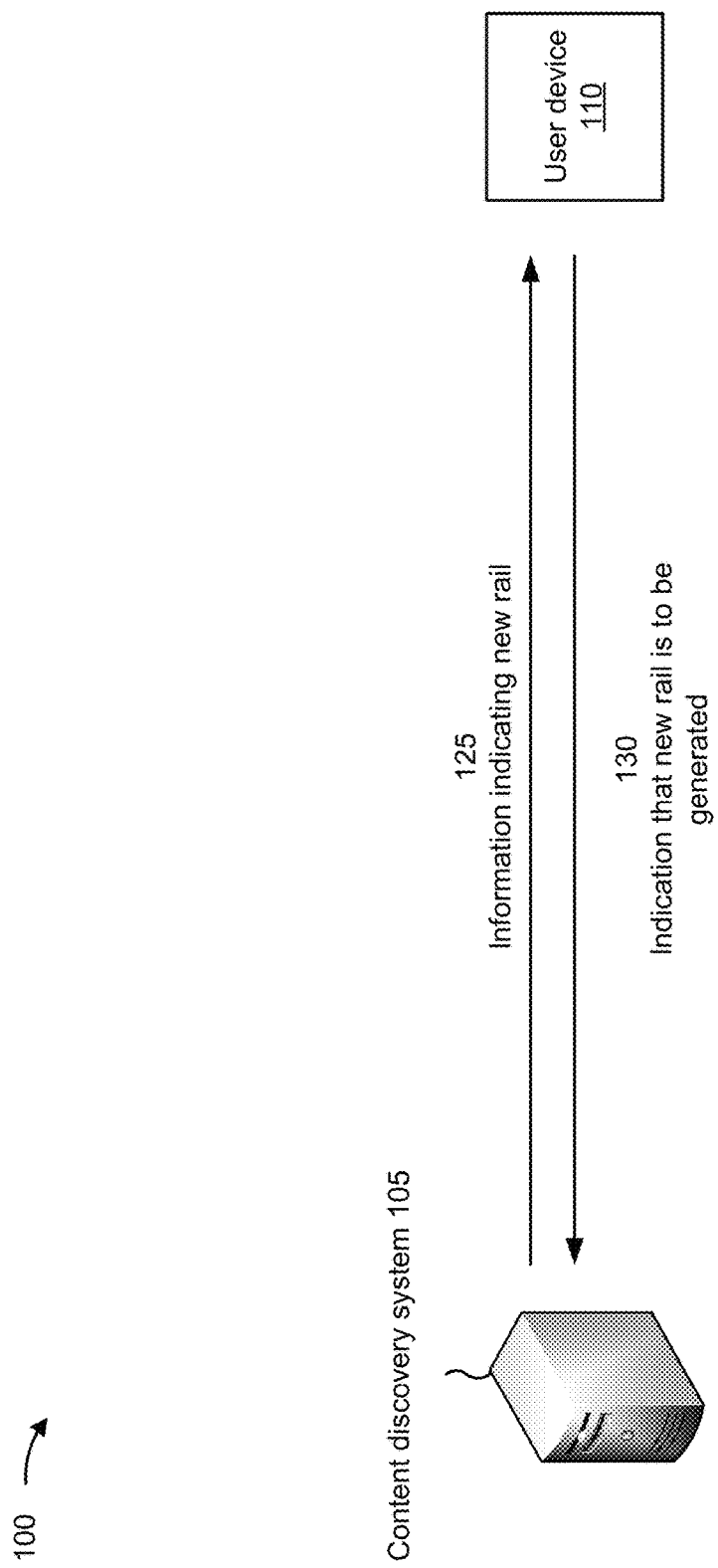

As shown in FIG. 1C, and by reference number 125, the content discovery system 105 may provide information indicating the new rail to the user device 110. In some implementations, the information indicating the new rail may include information indicating the type of the new rail, a validity period associated with the new rail, a category associated with the new rail, filter criteria associated with the new rail, and/or an event associated with the new rail. The category and/or the filter criteria associated with the new rail may be a periodic category or filter criteria (e.g., a season, a day of the week, a month of the year, weekends, weekdays, and/or a time of day, among other examples) and/or a non-periodic category and/or filter criteria (e.g., an award for which an actor or content has been nominated and/or received, a genre, a name of an actor associated with content, an audience type (e.g., children, teens, adults, sport fans, fans of dramas, fans of comedies, and/or the like), a release date associated with the content, a date of a premier, a date of a finale, a country in which the content was released, a language associated with the content, and/or whether sub-titles are available, among other examples).

In some implementations, the information indicating the new rail may include information associated with the identified set of previously generated rails. For example, the information indicating the new rail may include information indicating a quantity of rails included in the set of previously generated rails, a type of the rails included in the set of previously generated rails, and/or other information indicating a basis for which the previously generated rails were generated that is also valid for determining that the new rail is to be generated.

In some implementations, the user device 110 is associated with a content distributer (e.g., a curator) responsible for generating rails. The content distributer may review the information indicating the new rail and may determine whether the new rail is to be generated.

In some implementations, the user may determine that the new rail is not to be generated. For example, the user may determine that the set of previously generated rails are associated with an annual event that has been cancelled. In some implementations, the user may provide, via the user device 110, information indicating that the new rail is not to be generated to the content discovery system 105. The content discovery system 105 may not generate the new rail based on the provided information.

In some implementations, the user may determine that the new rail is to be generated. In some implementations, the user may provide, to the content discovery system 105 via the user device 110, information indicating that the new rail is to be generated. As shown by reference number 130, the content discovery system 105 may receive the information indicating that the new rail is to be generated from the user device 110.

In some implementations, the content discovery system 105 may determine whether the new rail is to be generated based on an expiration of a time period. For example, the content discovery system 105 may determine that the new rail is not to be generated when an indication indicating that the new rail is to be generated is not received prior to the expiration of a time period (e.g., 1 hour, 1 day, or 1 week, among other examples).

As shown in FIG. 1D, and by reference number 135, the content discovery system 105 may identify content associated with the new rail. In some implementations, the content discovery system 105 may identify the content associated with the new rail based on the identified set of previously generated rails. For example, the content discovery system 105 may determine content associated with a previously generated rail that is included in the set of previously generated rails. The content discovery system 105 may determine one or more parameters associated with the content (e.g., a keyword, a search filter, a genre, a format, and/or a season, among other examples). The content discovery system 105 may utilize the one or more parameters to identify a collection of content. For example, the content discovery system 105 may generate a set of search filters based on the one or more parameters and may utilize the set of search filters to search a database of content.

In some implementations, the content discovery system 105 may determine the content to be associated with the new rail based on providing, as an input to a machine learning model, information associated with the new rail. The machine learning model may be trained to determine a collection of content to be associated with a rail. For example, the content discovery system 105 may utilize the historical rail information to train the machine learning model to determine a collection of content to be associated with a rail. In some implementations, the machine learning model may be trained to determine the collection of content in a manner similar to that described below with respect to FIG. 2.

In some implementations, the content discovery system 105 may provide, to the user device 110, information indicating the content included in the group of content associated with the new rail. For example, the content discovery system 105 may provide information indicating the content included in the group of content associated with the new rail to the user device 110 to enable a user to review the group of content prior to the content discovery system 105 generating the new rail.

In some implementations, the content discovery system 105 may receive modification information based on providing the information indicating the content to the user device 110. The modification information may indicate a modification to the content included in the group of content. For example, the modification information may indicate content to be added to the group of content and/or content to be removed from the group of content. The content discovery system 105 may modify the content included in the group of content based on the modification information. The content discovery system 105 may generate the new rail based on modifying the content included in the group of content.

Figure 1E:
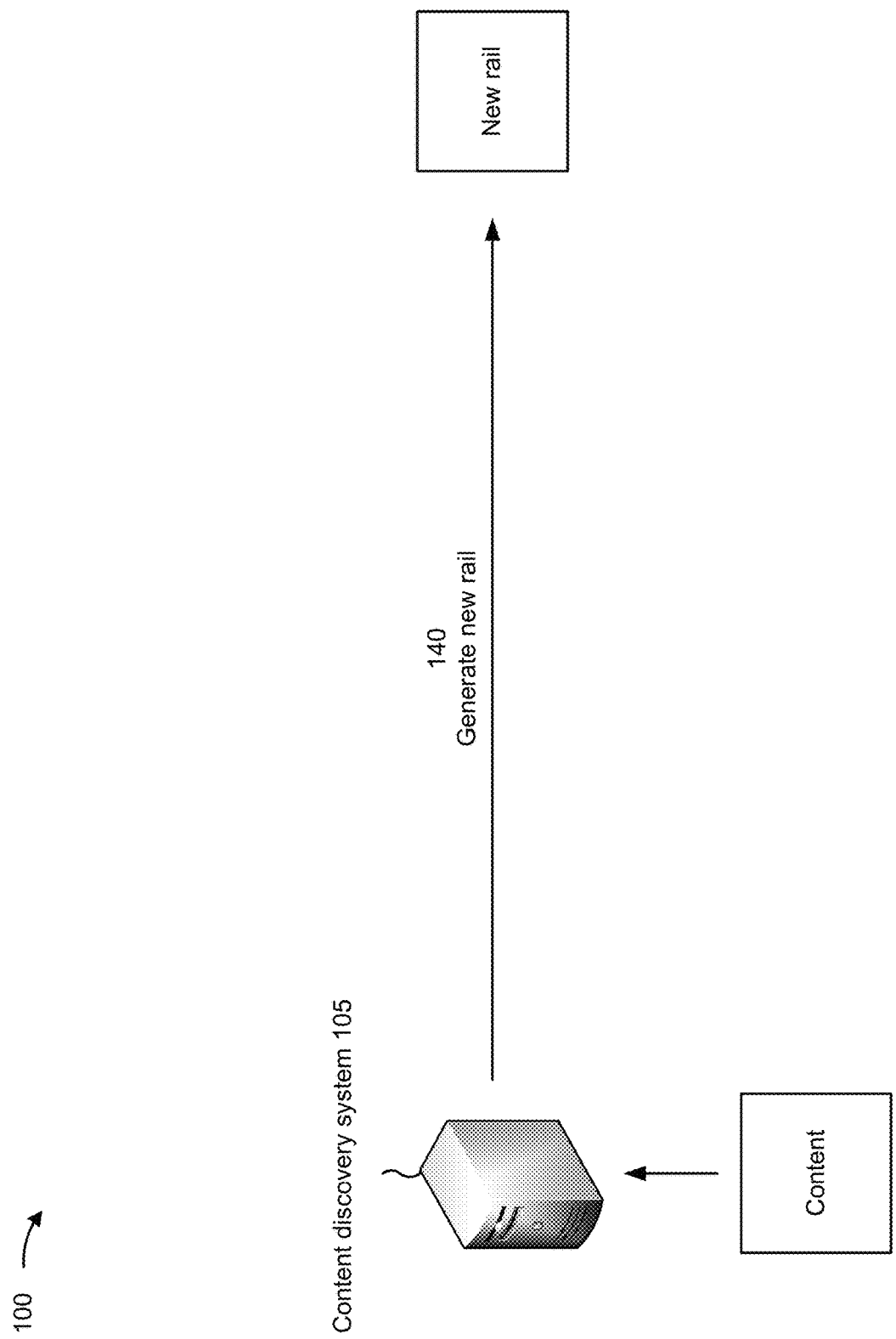

As shown in FIG. 1E, and by reference number 140, the content discovery system 105 may generate the new rail based on the identified content. In some implementations, the new rail may include a display element that can be selected (e.g., by a user) to cause information associated with the identified content to be displayed. In some implementations, the information associated with the identified content may include a group of content display elements. Each content display element may be configured to enable a user to select the content display element to access content (e.g., a movie) associated with the content display element.

Figure 1F:
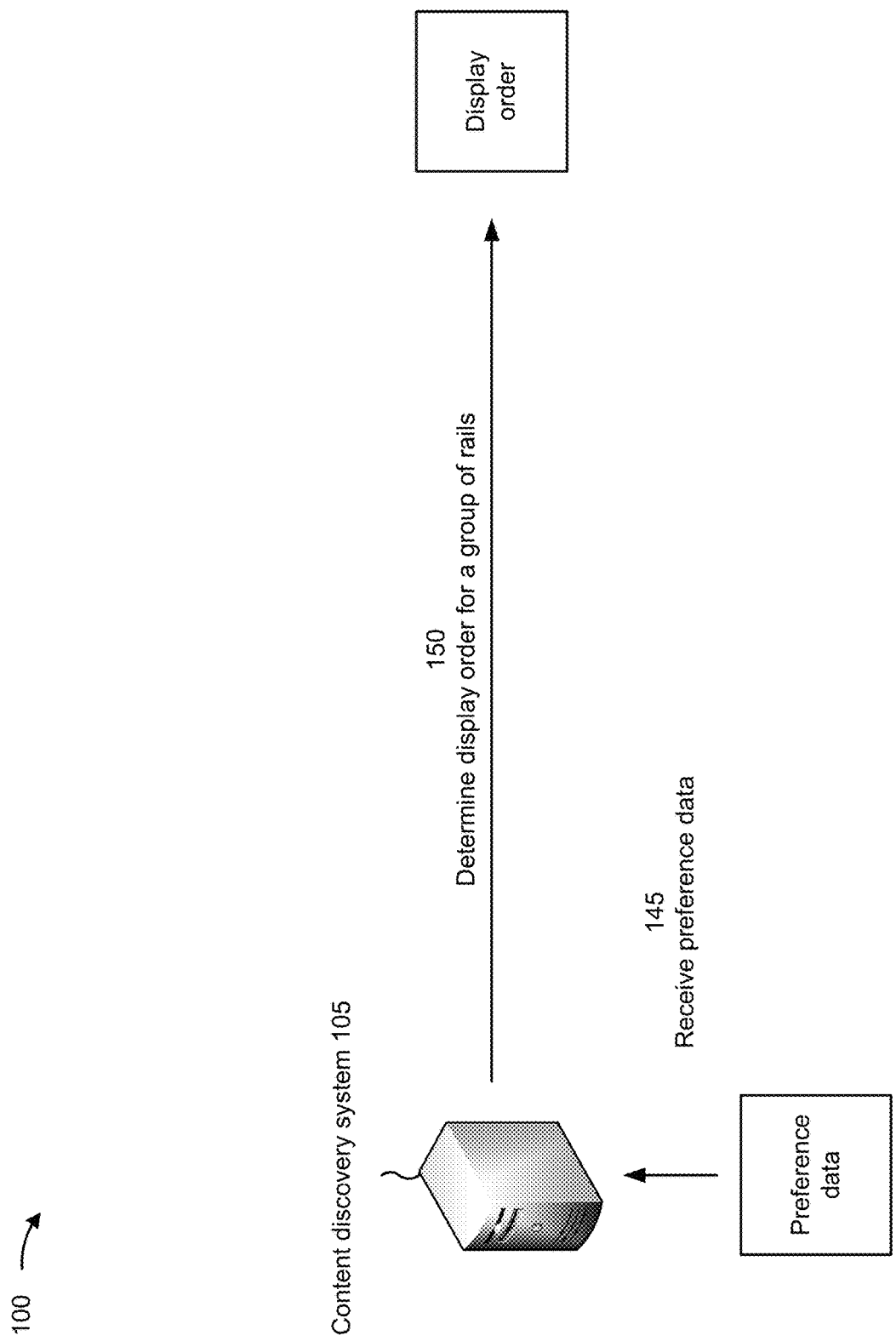

As shown in FIG. 1F, and by reference number 145, the content discovery system 105 may receive preference data associated with one or more users. In some implementations, the one or more users may include a single user. In some implementations, the one or more users may include a group of users. In some implementations, the group of users may be associated with a common characteristic. For example, the group of users may be associated with a same range of ages, may live in a same town or city, may have a same marital status (e.g., single, married, divorced, or widowed), may subscribe to a same service provided by a service provider associated with the content discovery system 105, may have viewed a particular type of content (e.g., horror movies) a threshold quantity of times, and/or may have similar incomes, among other examples.

In some implementations, the content discovery system 105 may receive the preference data from one or more user devices 110 associated with the one or more users. In some implementations, the content discovery system 105 may receive the preference data from another device. For example, the content discovery system 105 may receive the preference data from a server device associated with a service provider associated with the content discovery system 105.

In some implementations, the preference data may indicate an interaction by the one or more users with a group of rails provided for display to the one or more users. For example, the content discovery system 105 may cause a user device 110 associated with a user to display a group of rails over a time period (e.g., a day, a week, or a month, among other examples). The user device 110 may provide information indicating a quantity of times that each rail, of the group of rails, is selected by the user during the time period.

In some implementations, the preference data may indicate other information associated with the one or more users. For example, the preference data may include a list of web pages viewed by the one or more users, user profile information associated with the one or more users (e.g., information input by the one or more users when registering for a service associated with the content discovery system 105), content (e.g., video content and/or audio content) accessed by the one or more users, location data associated with the one or more users (e.g., a home address of the one or more users, a location visited by the one or more users, or a work address of the one or more users), and/or another type of information indicating a preference of the one or more users.

As shown by reference number 150, the content discovery system 105 may determine a display order associated with a group of rails based on the preference data. The display order may indicate a position of each rail within a list of rails provided for display (e.g., to one or more users).

In some implementations, the display order may be an initial display order. For example, the preference data may indicate a quantity of selections for each rail selected by a user during a time period and/or a total quantity of selections of rails selected by the user during the time period. The content discovery system 105 may determine that one or more of the quantity of selections for each rail selected by the user and/or the total quantity of selections of rails satisfies one or more criteria (e.g., is less than a threshold quantity). The content discovery system 105 may determine the display order to be the initial display order based on the one or more of the quantity of selections for each rail selected by the user and/or the total quantity of selections of rails satisfying the one or more criteria.

In some implementations, the initial display order may be a randomized display order. For example, the content discovery system 105 may randomly select a rail from the group of rails for each position within the list of rails.

In some implementations, the content discovery system 105 may determine the initial display order based on text associated with each rail. For example, the content discovery system 105 may generate an alphabetical listing of the rails based on the text associated with each rail and may determine the initial display order based on the alphabetical listing.

In some implementations, the content discovery system 105 may determine the initial display order based on a display order associated with one or more other users. For example, the content discovery system 105 may identify another user associated with one or more preferences that are similar to the one or more users for which the display order is determined. The content discovery system 105 may determine the initial display order based on the display order associated with the one or more other users.

In some implementations, the content discovery system 105 may determine the display order based on ranking the rails included in the group of rails. In some implementations, the content discovery system 105 may rank the rails included in the group of rails based on the preference data. In some implementations, the content discovery system 105 may rank the rails based on a quantity of selections associated with each rail. For example, the content discovery system 105 may determine a quantity of selections of each rail based on the preference data and may rank the rails based on the quantity of selections.

In some implementations, the quantity of selections associated with a rail may be a global quantity of selections. The global quantity of selections may indicate a total quantity of times that a rail was selected by all users.

In some implementations, the quantity of selections associated with a rail may be a cluster quantity of selections. The cluster quantity of selections may indicate a quantity of times that a rail was selected by a group of users. For example, the cluster quantity of selections may indicate a quantity of times that a rail was selected by users located within a particular geographic region, by users having an age within a particular range of ages, during a particular time period (e.g., between 7:00 pm through 10:00 pm), by users associated with a particular gender, and/or by users selecting at least a threshold quantity of rails during a time period, among other examples.

In some implementations, the quantity of selections associated with a rail is a user quantity of selections. The user quantity of selections may indicate a quantity of times that a rail was selected by a particular user.

In some implementations, the quantity of selections associated with a rail is determined based on two or more of the global quantity of selections, the cluster quantity of selections, and the user quantity of selections. For example, the quantity of selections may be determined based on a sum, a product, an average, and/or a weighted average of the global quantity of selections, the cluster quantity of selections, and the user quantity of selections.

In some implementations, the content discovery system 105 may rank the rails based on the content associated with each rail. For example, the content discovery system 105 may determine one or more characteristics associated with each content, of the group of content associated with the rail. The content discovery system 105 may determine a respective preference score for each content based on the one or more characteristics associated with each content. The content discovery system 105 may determine a rail score for the rail based on the preference scores determined for the group of content associated with the rail. The content discovery system 105 may rank the rails based on the respective rail score determined for each rail in the group of rails.

As an example, a rail may be associated with first content and second content. The first content may be associated with a first characteristic and the second content may be associated with a second characteristic. The second characteristic may be the same as, or different from, the first characteristic. The content discovery system 105 may analyze the preference data to determine a quantity of selections of rails associated with content having the first characteristic, a quantity of interactions with content associated with the first characteristic, and/or other information indicating a level of preference of a user for content associated with the first characteristic.

The content discovery system 105 may determine a first preference score for the first content based on the quantity of selections of rails associated with content having the first characteristic, the quantity of interactions with content associated with the first characteristic, and/or the other information indicating a level of preference of a user for content associated with the first characteristic. In some implementations, the content discovery system 105 may analyze the preference data and may determine a second preference score for the second content in a similar manner.

The content discovery system 105 may determine a rail score for the rail based on the first preference score and/or the second preference score. In some implementations, the content discovery system 105 may determine the rail score based on an average preference score. For example, the content discovery system 105 may determine an average of the respective preference scores determined for content associated with the rail (e.g., the first preference score and the second preference score). The content discovery system 105 may determine the rail score based on the average of the respective preference scores.

In some implementations, the content discovery system 105 may determine the rail score based on a highest preference score. For example, the content discovery system 105 may determine that the first preference score is a highest preference score relative to the second preference score. The content discovery system 105 may determine the rail score as corresponding to the first preference score based on the first preference score being the highest preference score.

In some implementations, the content discovery system 105 may determine the rail score based on a lowest preference score. For example, the content discovery system 105 may determine that the first preference score is a lowest preference score relative to the second preference score. The content discovery system 105 may determine the rail score as corresponding to the first preference score based on the first preference score being the lowest preference score.

In some implementations, the content discovery system 105 may determine the rail score for a rail based on one or more characteristics of the rail. In some implementations, content discovery system 105 may determine the one or more characteristics based on a rail definition associated with the rail. The rail definition may indicate one or more characteristics of the group of content associated with the rail. For example, the rail definition may indicate a genre, a time period, and/or a format, among other examples, associated with the group of content. In some implementations, the rail definition may be defined in terms of metadata, one or more keywords, and/or one or more search filters.

In some implementations, the content discovery system 105 may determine the rail score by calculating rail dimensions and values for the rail based on the rail definition. As an example, the rail definition may correspond to:

{'genres':['action', 'adventure'] && 'actor':['Tom Hanks'] && 'release year'>'2019'.

The content discovery system 105 may generate a rail vector and a preference vector based on the dimensions indicated by the rail definition (e.g., genres, actor, and release year). The preference vector may include the dimensions indicated by the rail definition, and a value of each dimension may correspond to a preference score associated with the dimension that is determined based on the preference data. The content discovery system 105 may determine a similarity between the preference vector and the rail vector. For example, the content discovery system 105 may compute a distance between the preference vector and the rail vector. The content discovery system 105 may determine the rail score based on the similarity between the preference vector and the rail vector.

The content discovery system 105 may determine a preference score associated with the rail based on the rail definition. In some implementations, the content discovery system 105 may determine the preference score for the rail in a manner similar to that described above with respect to determining the first preference score. The content discovery system 105 may determine the rail score based on the preference score determined for the rail. For example, the content discovery system 105 may determine the rail score as corresponding to the preference score determined for the rail.

The content discovery system 105 may determine the display order based on ranking the rails. For example, the content discovery system 105 may determine that a highest ranked rail relative to the other rails is positioned first in the list of rails. The content discovery system 105 may determine that a second highest ranked rail relative to the other rails is positioned second in the list of rails. The content discovery system 105 may continue in a similar manner until a quantity of rails (e.g., all the rails included in the group of rails, 10 rails, or 20 rails, among other examples) are included in the list of rails.

In some implementations, the content discovery system 105 may determine the display order based on ranking the rails and based on randomly selecting a position of one or more rails within the list of rails. For example, the list of rails may include a series of positions (e.g., 1 through 10). The content discovery system 105 may determine that rails to be included in a first set of positions (e.g., 1 through 3 and 6 through 8) are to be determined based on ranking the rails, and that rails to be included in a second set of positions (e.g., 4 through 6, 9, and 10) are to be randomly selected from the group of rails.

In some implementations, the content discovery system 105 may determine a total quantity of positions (P) included in the list of rails. The content discovery system 105 may determine a quantity of positions (K) included in the list of rails that are to be determined based on ranking the rails. In some implementations, the total quantity of positions may be equal to the quantity of positions determined based on ranking the rails (e.g., P=K). The content discovery system 105 may determine that the list of rails does not include any randomly selected rails based on the total quantity of positions being equal to the quantity of positions determined based on ranking the rails.

In some implementations, the content discovery system 105 may determine that the total quantity of positions may be greater than the quantity of positions that are determined based on ranking the rails (e.g., P>K). The content discovery system 105 may determine the quantity of positions (R) that are to be randomly selected based on a difference between the total quantity of positions and the quantity of positions determined based on ranking the rails (e.g., R=P−K).

The content discovery system 105 may rank the group of rails based on the respective quantity of selections associated with the group of rails. The content discovery system 105 may select a quantity of rails (K) for the quantity of positions that are determined based on ranking the rails from the group of rails. The content discovery system 105 may randomly select a quantity of rails (R) from the group of rails for the positions that are to be randomly selected.

Figure 1G:
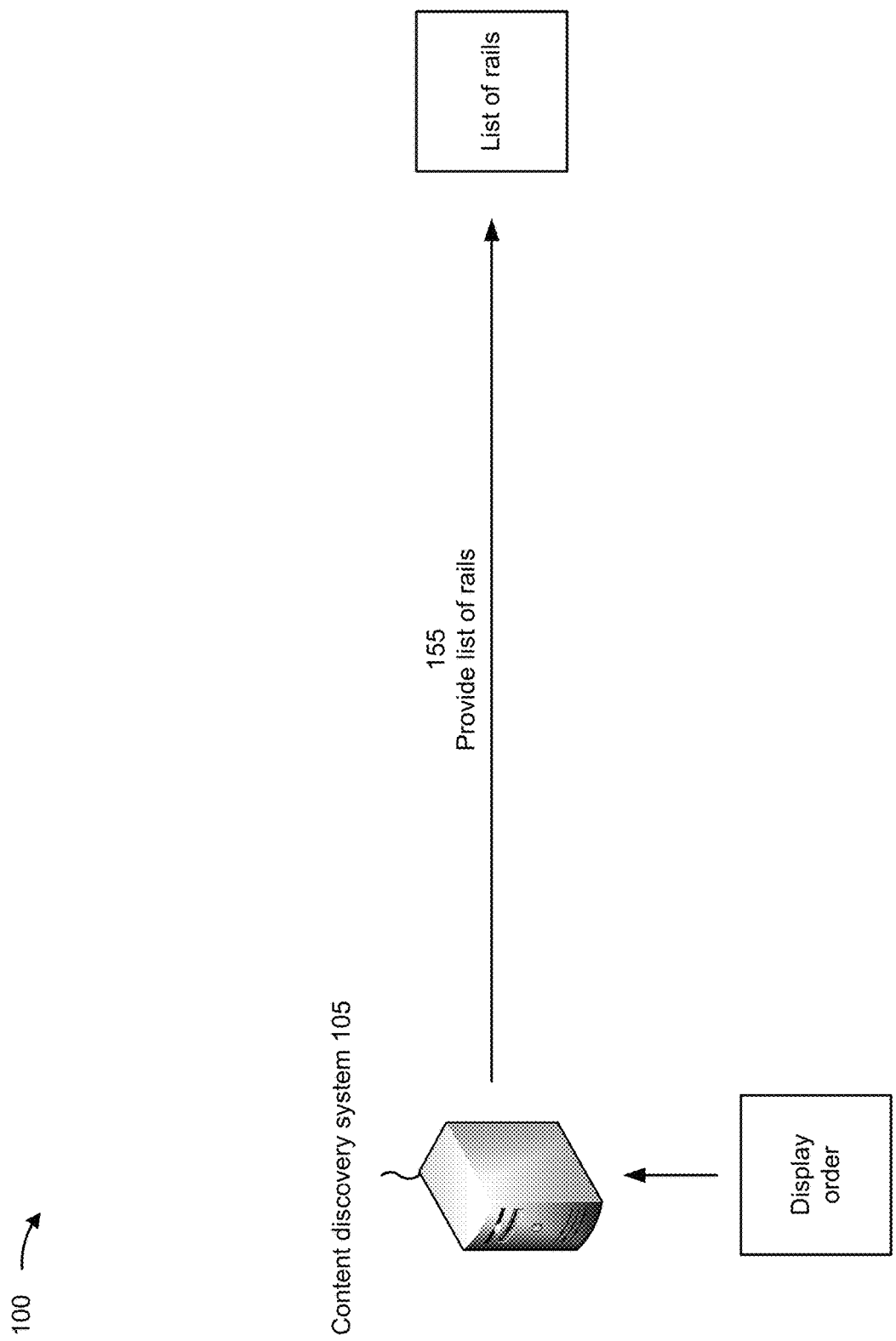

As shown in FIG. 1G, and by reference number 155, the content discovery system 105 may provide the group of rails for display based on the display order. In some implementations, the content discovery system 105 may receive additional preference data associated with providing the group of rails for display based on the display order. For example, the content discovery system 105 may receive additional preference data indicating a quantity of times that each rail is selected by a user during a time period.

In some implementations, the content discovery system 105 may modify the display order based on the additional preference data. For example, the content discovery system 105 may re-rank the rails based on the quantity of times that each rail is selected and may modify the display order based on re-ranking the rails.

In some implementations, the content discovery system 105 may modify the rails included in the group of rails based on the additional preference data. In some implementations, the content discovery system 105 may remove a rail from the group of rails. For example, the content discovery system 105 may determine that a quantity of times that a rail is selected satisfies one or more removal criteria (e.g., is less than a threshold quantity of times). The content discovery system 105 may remove the rail from the group of rails based on the quantity of times that the rail is selected satisfying the one or more removal criteria. The content discovery system 105 may modify the display order based on removing the rail from the group of rails.

In some implementations, the content discovery system 105 may add a new rail to the group of rails. For example, the content discovery system 105 may determine that a quantity of times that a rail is selected satisfies one or more additional criteria (e.g., is greater than a threshold quantity of times). The content discovery system 105 may determine a group of content associated with the rail. The content discovery system 105 may determine one or more characteristics associated with the group of content (e.g., a genre, an actor, a release date, and/or a format, among other examples).

In some implementations, the content discovery system 105 may identify additional content based on the one or more characteristics. The content discovery system 105 may generate a new rail that, when selected, enables a user to view the additional content. The content discovery system 105 may add the new rail to the group of content and may modify the display order based on adding the new rail to the group of content.

In some implementations, the content discovery system 105 may identify a stored rail based on the one or more characteristics. For example, the content discovery system 105 may identify a rail stored in a memory associated with the content discovery system 105 that, when selected, enables a user to view a group of content having characteristics similar to the one or more characteristics. The content discovery system 105 may add the stored rail to the group of rails and may modify the display order based on adding the stored rail to the group of rails. The content discovery system 105 may provide the group of rails for display to a user based on modifying the display order of the group of rails.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
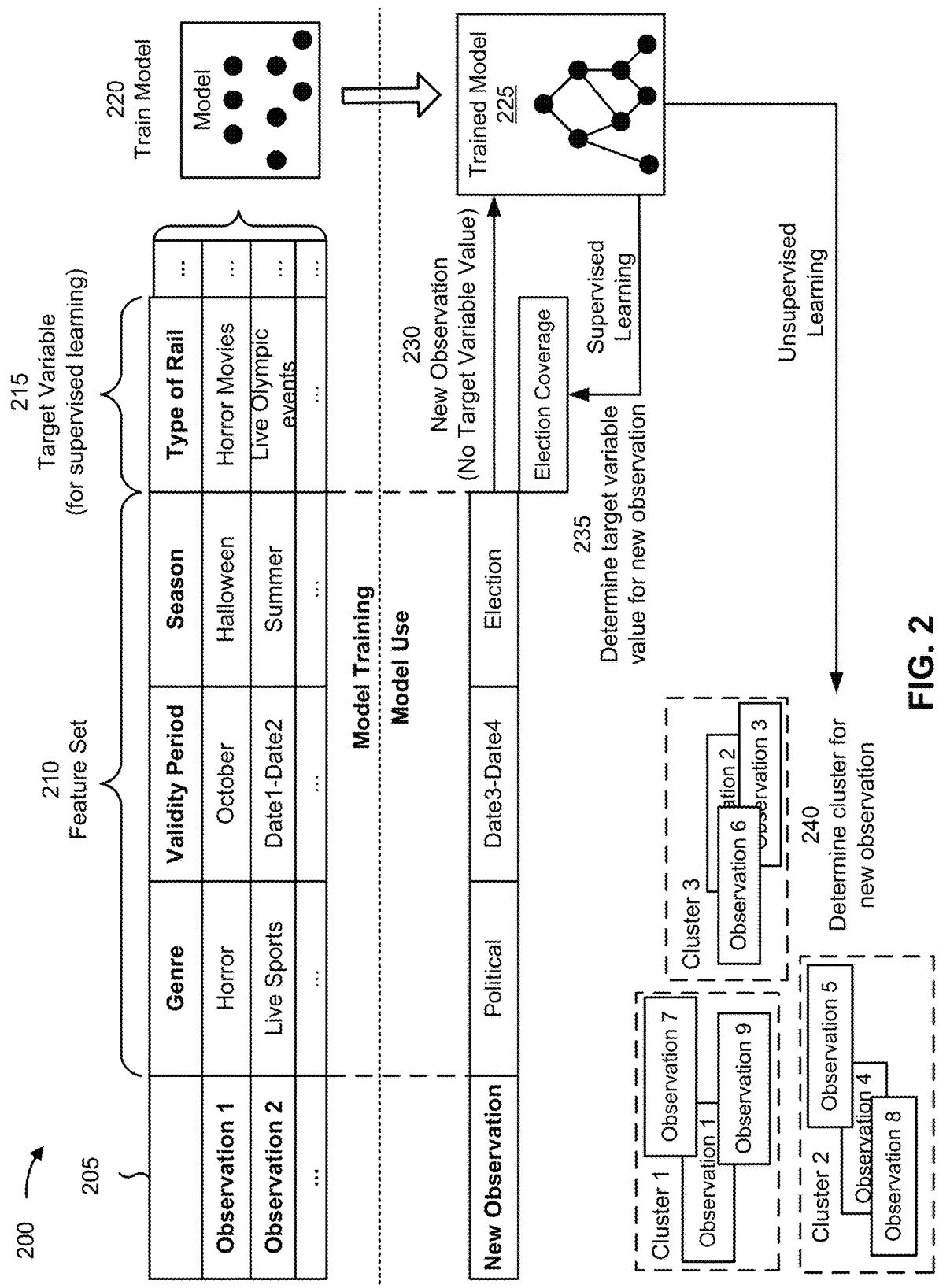
FIG. 2 is a diagram of training and using a machine learning model in connection with content discovery by the automatic organization of collections or rails.

FIG. 2 is a diagram illustrating an example 200 of training and using a machine learning model in connection with content discovery by the automatic organization of collections or rails. The machine learning model training and usage described herein may be performed using a machine learning system. The machine learning system may include or may be included in a computing device, a server, a cloud computing environment, or the like, such as the content discovery system 105 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the content discovery system 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the content discovery system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of genre, a second feature of validity period, a third feature of season, and so on. As shown, for a first observation, the first feature may have a value of horror, the second feature may have a value of October, the third feature may have a value of Halloween, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is type of rail, which has a value of horror movies for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of genre, a second feature of validity period, a third feature of season, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of election coverage for the target variable of type of rail for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to generate the type of rail. The first automated action may include, for example, generating the type of rail.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., rails to be generated based on receiving approval from a user), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as automatically providing information associated with the new rail to a user device.

As another example, if the machine learning system were to classify the new observation in a second cluster (e.g., rails to be automatically generated), then the machine learning system may provide a second (e.g., different) recommendation (e.g., a recommendation indicating that a new rail is to be automatically generated) and/or may perform or cause performance of a second (e.g., different) automated action, such as automatically generating the new rail.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In this way, the machine learning system may apply a rigorous and automated process to determining new rails to be generated and/or generating new rails. The machine learning system enables recognition and/or identification of tens, hundreds, thousands, or millions of features and/or feature values for tens, hundreds, thousands, or millions of observations, thereby increasing accuracy and consistency and reducing delay associated with determining new rails to be generated and/or generating new rails relative to requiring computing resources to be allocated for tens, hundreds, or thousands of operators to manually determine new rails to be generated using the features or feature values.

As indicated above, FIG. 2 is provided as an example. Other examples may differ from what is described in connection with FIG. 2.

Figure 3:
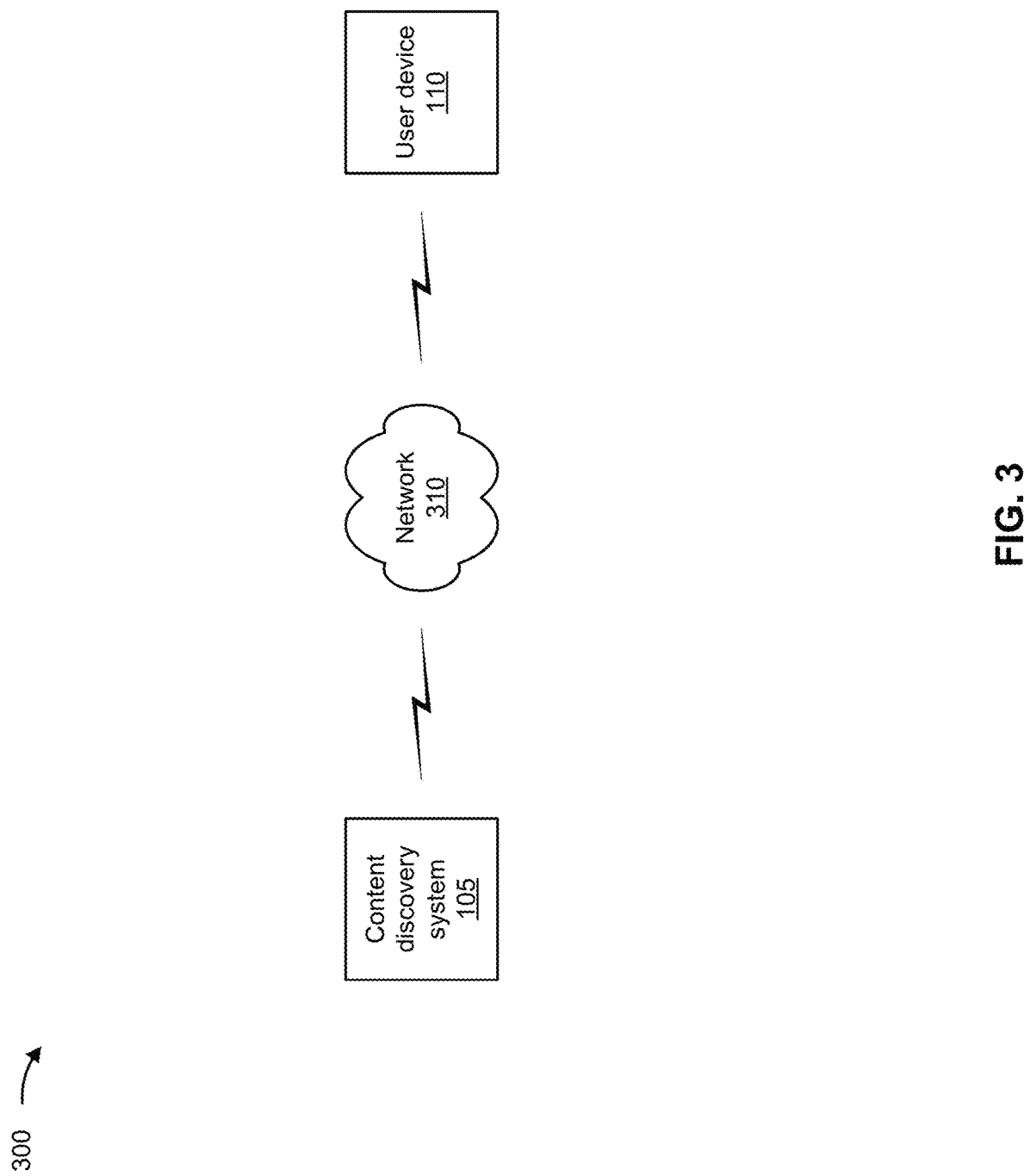
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a content discovery system 105, a user device 110, and a network 310. Devices of environment 300 may interconnect via wired connections, wireless connections, or a combination of wired and wireless connections.

The content discovery system 105 includes one or more devices capable of receiving, generating, storing, processing, providing, and/or routing information associated with content discovery by automatic organizing of collections or rails, as described elsewhere herein. The content discovery system 105 may include a communication device and/or a computing device. For example, the content discovery system 105 may include a server, such as an application server, a client server, a web server, a database server, a host server, a proxy server, a virtual server (e.g., executing on computing hardware), or a server in a cloud computing system. In some implementations, the content discovery system 105 includes computing hardware used in a cloud computing environment.

The user device 110 includes one or more devices capable of receiving, generating, storing, processing, and/or providing information associated with content discovery by the automatic organizing of collections or rails, as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 310 includes one or more wired and/or wireless networks. For example, the network 310 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 310 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
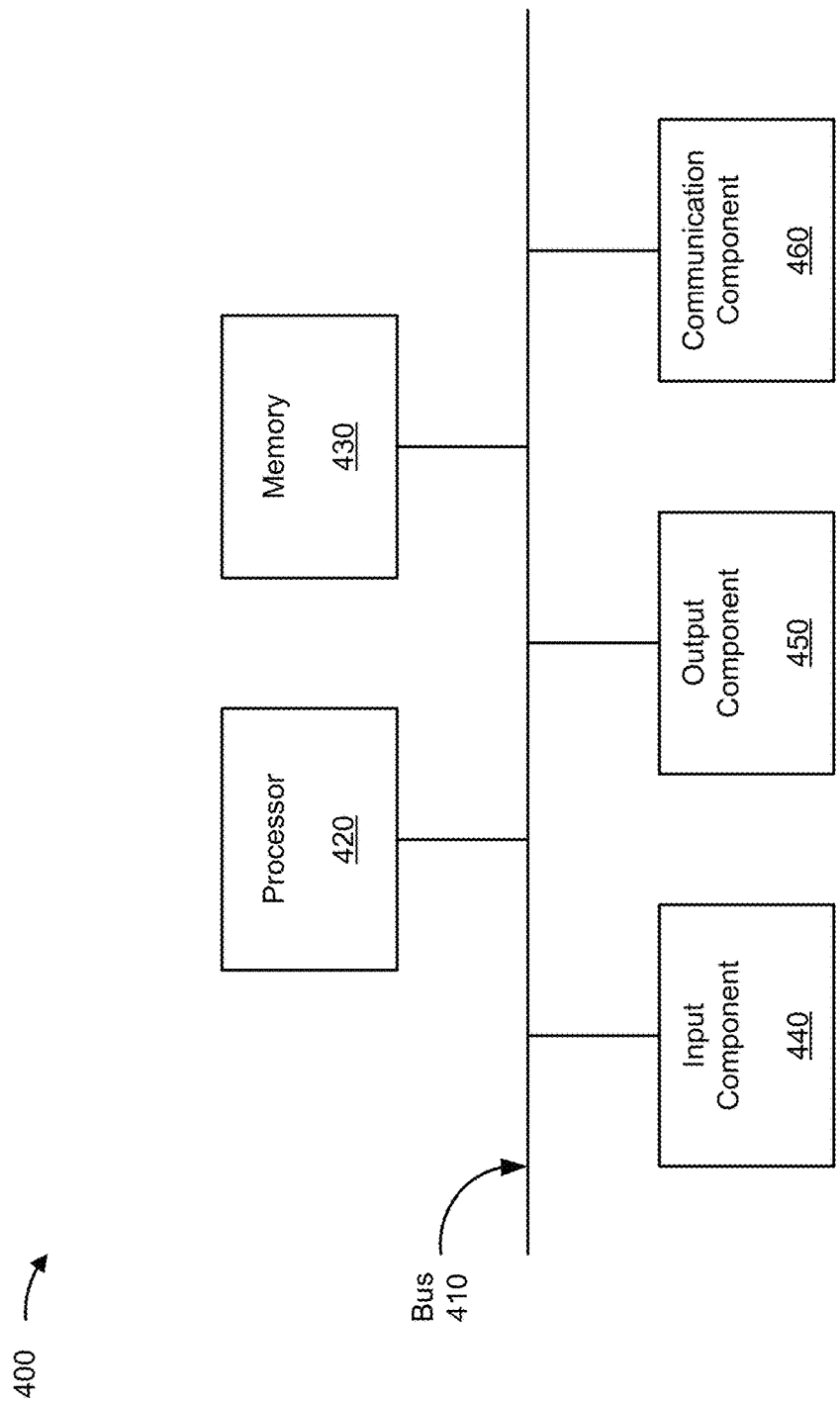
FIG. 4 is a diagram of example components of one or more devices of FIG. 3.

FIG. 4 is a diagram of example components of a device 400, which may correspond to the content discovery system 105 and/or the user device 110. In some implementations, the content discovery system 105 and/or the user device 110 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
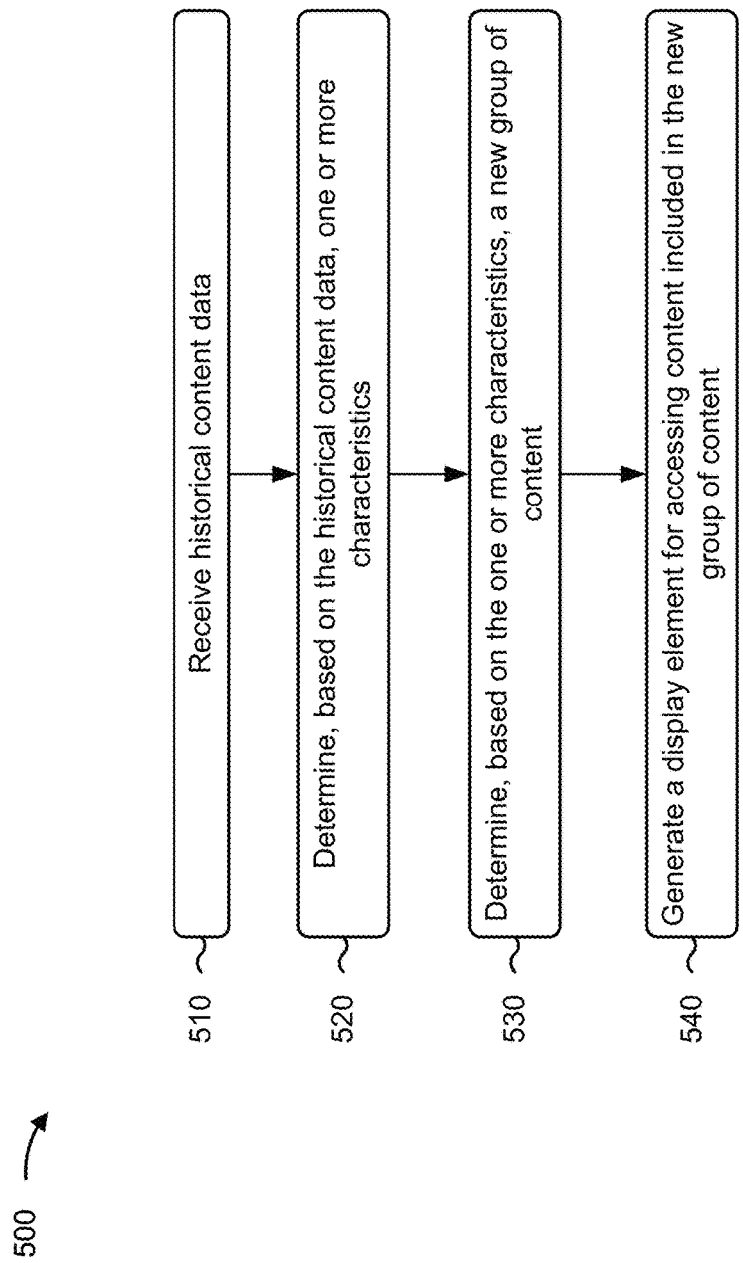
FIG. 5 is a flowchart of an example process relating to content discovery by the automatic organization of collections or rails.

FIG. 5 is a flowchart of an example process 500 associated with systems and methods for content discovery by the automatic organization of collections or rails. In some implementations, one or more process blocks of FIG. 5 may be performed by a device (e.g., the content discovery system 105). In some implementations, one or more process blocks of FIG. 5 may be performed by another device or a group of devices separate from or including the device, such as a user device (e.g., the user device 110). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving historical content data (block 510). For example, the device may receive historical content data indicating historical characteristics associated with one or more groups of content, as described above.

In some implementations, the historical content data indicates a genre associated with a group of content, of the one or more groups of content, a topic associated with the group of content, a date on which the group of content was created, a time period during which the group of content was available to a user, a season associated with the group of content, trending information indicating a quantity of times the group of content was selected by a group of one or more users, a user associated with creating the group of content, a search query information indicating one or more filters associated with the group of content, information indicating one or more keywords associated with the group of content, selection information indicating a quantity of times the group of content was accessed by a user, and/or information indicating a position within a rail at which the group of content was displayed.

As further shown in FIG. 5, process 500 may include determining, based on the historical content data, one or more characteristics (block 520). For example, the device may determine, based on the historical content data, one or more characteristics associated with a time period, as described above.

As further shown in FIG. 5, process 500 may include determining, based on the one or more characteristics, a new group of content (block 530). For example, the device may determine, based on the one or more characteristics, a new group of content associated with the time period, as described above. In some implementations, the device may utilize the historical content data to train a model to determine the new group of content based on information identifying the time period, a season associated with the time period, and/or trending information indicating a quantity of times that particular content is accessed by a group of one or more users during another time period that is prior to the time period.

As further shown in FIG. 5, process 500 may include generating a display element for accessing content included in the new group of content (block 540). For example, the device may generate a display element for accessing content included in the new group of content during the time period, as described above.

In some implementations, the device may provide information identifying the new group of content. For example, the device may provide information identifying the new group of content to a user device associated with a user responsible for generating new rails. The device may receive, based on providing the information identifying the new group of content, information indicating that the new group of content is to be accessible to a user during the time period. In some implementations, the device may generate the display element based on receiving the information indicating that the new group of content is to be accessible to the user during the time period.

In some implementations, the device may receive modification information indicating a modification to the content included in the new group of content. The device may modify the content included in the new group of content based on the modification information. In some implementations, the device may generate the display element based on modifying the content associated with the new group of content.

In some implementations, the device may receive selection data indicating a quantity of selections associated with each group of content, of a plurality of groups of content. In some implementations, the plurality of groups of content may include the new group of content. The device may determine, based on the selection data, preference data associated with each group of content. The device may rank, based on the preference data associated with each group of content, the plurality of groups of content to generate a ranked list of groups of content. The device may provide, for display to a user, the display element for accessing the new group of content based on the ranked list of groups of content.

In some implementations, the device may receive interaction data indicating user interactions associated with a plurality of types of content. The device may determine that the new group of content is associated with a first set of types of content, of the plurality of types of content, and that another group of content is associated with a second set of types of content, of the plurality of types of content. The device may determine, based on the interaction data, a first quantity of interactions associated with the first set of types of content and a second quantity of interactions associated with the second set of types of content. The device may determine a first preference score for the new group of content based on the first quantity of interactions and a second preference score for the other group of content based on the second quantity of interactions. The device may rank, based on the first preference score and the second preference score, the new group of content relative to the other group of content. The device may provide the display element for accessing the new group of content for display to a user based on ranking the new group of content relative to the other group of content.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, historical content data and a set of parameters, wherein the historical content data indicates historical characteristics associated with a plurality of groups of content, and wherein the set of parameters are associated with a time period;
    determining, by the device and based on the historical content data, one or more groups of content, of the plurality of groups of content, associated with the set of parameters;
    determining, by the device and based on a portion of the historical content data associated with the one or more groups of content, one or more characteristics associated with the one or more groups of content,
        wherein the one or more characteristics associated with the one or more groups of content includes, for each group of content of the one or more groups of content, information associated with one or more search queries input by one or more users and information indicating one or more search filters used to generate the group of content;
    generating, by the device and based on the one or more characteristics, a set of search filters;
    utilizing, by the device, the set of search filters to identify content to be included in a new group of content associated with the time period; and
    generating, by the device, a display element for accessing the content included in the new group of content during the time period.

2. The method of claim 1, further comprising:
    providing information identifying the new group of content; and
    receiving, based on providing the information identifying the new group of content, information indicating that the new group of content is to be accessible to a user during the time period,
        wherein the display element is generated based on receiving the information indicating that the new group of content is to be accessible to the user during the time period.

3. The method of claim 1, further comprising:
    receiving modification information indicating a modification to content included in the new group of content; and
    modifying the content included in the new group of content based on the modification information, wherein the display element is generated based on modifying the content included in the new group of content.

4. The method of claim 1, further comprising:
utilizing the historical content data to train a model based on information identifying one or more of:
the time period,
a season associated with the time period, or
trend information indicating a quantity of times particular content is accessed by a group of one or more users during another time period that is prior to the time period,
wherein the model is trained to determine the new group of content.

5. The method of claim 1, further comprising:
receiving selection data indicating a quantity of selections associated with each group of content, of the plurality of groups of content, wherein the plurality of groups of content includes the new group of content;
determining, based on the selection data, preference data associated with each group of content;
ranking, based on the preference data associated with each group of content, the plurality of groups of content to generate a ranked list of groups of content; and
providing, for display to a user, the display element for accessing the content included in the new group of content based on the ranked list of groups of content.

6. The method of claim 1, further comprising:
receiving interaction data indicating user interactions associated with a plurality of types of content;
determining that the new group of content associated with the time period is associated with a first set of types of content, of the plurality of types of content, and that another group of content is associated with a second set of types of content, of the plurality of types of content;
determining, based on the interaction data, a first quantity of interactions associated with the first set of types of content and a second quantity of interactions associated with the second set of types of content; and
ranking, based on the first quantity of interactions and the second quantity of interactions, the new group of content associated with the time period and the first set of types of content relative to the other group of content.

7. The method of claim 6, further comprising:
determining a first preference score for the new group of content associated with the time period and the first set of types of content based on the first quantity of interactions and a second preference score for the other group of content based on the second quantity of interactions;
ranking, based on the first preference score and the second preference score, the new group of content associated with the time period and the first set of types of content relative to the other group of content; and
providing the display element for accessing the new group of content associated with the time period and the first set of types of content for display to a user based on ranking the new group of content associated with the first set of types of content relative to the other group of content.

8. A non-transitory computer-readable medium storing a set of instructions, the set of instructions comprising:
one or more instructions that, when executed by one or more processors of a device, cause the device to:
receive historical content data and a set of parameters, wherein the historical content data indicates historical characteristics associated with a plurality of groups of content, and wherein the set of parameters are associated with a time period;
determine, based on the historical content data, one or more groups of content, of the plurality of groups of content, associated with the set of parameters;
determine, based on a portion of the historical content data associated with the one or more groups of content, one or more characteristics associated with the one or more groups of content,
wherein the one or more characteristics associated with the one or more groups of content includes, for each group of content of the one or more groups of content, information associated with one or more search queries input by one or more users and information indicating one or more search filters used to generate the group of content;
generate, based on the one or more characteristics, a set of search filters;
utilize the set of search filters to identify content to be included in a new group of content associated with the time period; and
generate a display element for accessing the content included in the new group of content during the time period.

9. The non-transitory computer-readable medium of claim 8, wherein the one or more instructions further cause the device to:
provide information identifying the new group of content; and
receive, based on providing the information identifying the new group of content, information indicating that the new group of content is to be accessible to a user during the time period,
wherein the display element is generated based on receiving the information indicating that the new group of content is to be accessible to the user during the time period.

10. The non-transitory computer-readable medium of claim 8, wherein the one or more instructions further cause the device to:
receive modification information indicating a modification to the content included in the new group of content; and
modify the content included in the new group of content based on the modification information,
wherein the display element is generated based on modifying the content included in the new group of content.

11. The non-transitory computer-readable medium of claim 8, wherein the one or more instructions further cause the device to:
utilize the historical content data to train a model based on information identifying one or more of:
the time period,
a season associated with the time period, or
trend information indicating a quantity of times particular content is accessed by a group of one or more users during another time period that is prior to the time period.

12. The non-transitory computer-readable medium of claim 8, wherein the one or more instructions further cause the device to:
receive selection data indicating a quantity of selections associated with each group of content, of the plurality of groups of content, wherein the plurality of groups of content includes the new group of content;

determine, based on the selection data, preference data associated with each group of content;

rank, based on the preference data associated with each group of content, the plurality of groups of content to generate a ranked list of groups of content; and provide, for display to a user, the display element for accessing the content included in the new group of content based on the ranked list of groups of content.

13. The non-transitory computer-readable medium of claim 8, wherein the one or more instructions further cause the device to:

receive interaction data indicating user interactions associated with a plurality of types of content;

determine that the new group of content associated with the time period is associated with a first set of types of content, of the plurality of types of content, and that another group of content is associated with a second set of types of content, of the plurality of types of content;

determine, based on the interaction data, a first quantity of interactions associated with the first set of types of content and a second quantity of interactions associated with the second set of types of content; and rank, based on the first quantity of interactions and the second quantity of interactions, the new group of content associated with the time period and the first set of types of content relative to the other group of content.

14. The non-transitory computer-readable medium of claim 13, wherein the one or more instructions further cause the device to:

determine a first preference score for the new group of content associated with the time period and the first set of types of content based on the first quantity of interactions and a second preference score for the other group of content based on the second quantity of interactions;

rank, based on the first preference score and the second preference score, the new group of content associated with the time period and the first set of types of content relative to the other group of content; and provide the display element for accessing the content included in the new group of content associated with the time period and the first set of types of content for display to a user based on ranking the new group of content relative to the other group of content.

15. A device, comprising:
one or more processors configured to:

receive historical content data and a set of parameters, wherein the historical content data indicates historical characteristics associated with a plurality of groups of content, and wherein the set of parameters are associated with a time period;

determine, based on the historical content data, one or more groups of content, of the plurality of groups of content, associated with the set of parameters;

determine, based on a portion of the historical content data associated with the one or more groups of content, one or more characteristics associated with the one or more groups of content, wherein the one or more characteristics associated with the one or more groups of content includes, for each group of content of the one or more groups of content, information associated with one or more search queries input by one or more users and information indicating one or more search filters used to generate the group of content;

generate, based on the one or more characteristics, a set of search filters;

utilize the set of search filters to identify content to be included in a new group of content associated with the time period; and generate a display element for accessing the content included in the new group of content during the time period.

16. The device of claim 15, wherein the one or more processors are further configured to:

provide information identifying the new group of content; and receive, based on providing the information identifying the new group of content, information indicating that the new group of content is to be accessible to a user during the time period, wherein the display element is generated based on receiving the information indicating that the new group of content is to be accessible to the user during the time period.

17. The device of claim 15, wherein the one or more processors are further configured to:

receive modification information indicating a modification to the content included in the new group of content; and modify the content included in the new group of content based on the modification information, wherein the display element is generated based on modifying the content included in the new group of content.

18. The device of claim 15, wherein the one or more processors are further configured to:

receive selection data indicating a quantity of selections associated with each group of content, of the plurality of groups of content, wherein the plurality of groups of content includes the new group of content;

determine, based on the selection data, preference data associated with each group of content;

rank, based on the preference data associated with each group of content, the plurality of groups of content to generate a ranked list of groups of content; and provide, for display to a user, the display element for accessing the content included in the new group of content based on the ranked list of groups of content.

19. The device of claim 15, wherein the one or more processors are further configured to:

receive interaction data indicating user interactions associated with a plurality of types of content;

determine that the new group of content associated with the time period is associated with a first set of types of content, of the plurality of types of content, and that another group of content is associated with a second set of types of content, of the plurality of types of content;

determine, based on the interaction data, a first quantity of interactions associated with the first set of types of content and a second quantity of interactions associated with the second set of types of content; and rank, based on the first quantity of interactions and the second quantity of interactions, the new group of content associated with the time period and the first set of types of content relative to the other group of content.

20. The device of claim 19, wherein the one or more processors are further configured to:

determine a first preference score for the new group of content associated with the time period and the first set of types of content based on the first quantity of interactions and a second preference score for the other group of content based on the second quantity of interactions;

rank, based on the first preference score and the second preference score, the new group of content associated with the time period and the first set of types of content relative to the other group of content; and provide the display element for accessing the content included in the new group of content associated with the time period and the first set of types of content for display to a user based on ranking the new group of content associated with the time period and the first set of types of content relative to the other group of content.

\* \* \* \* \*